July 23, 1957     A. H. EMERY     2,799,941
MULTI-RANGE ADJUSTABLE DIAL INDICATOR GAUGE
Filed March 15, 1954     2 Sheets-Sheet 1
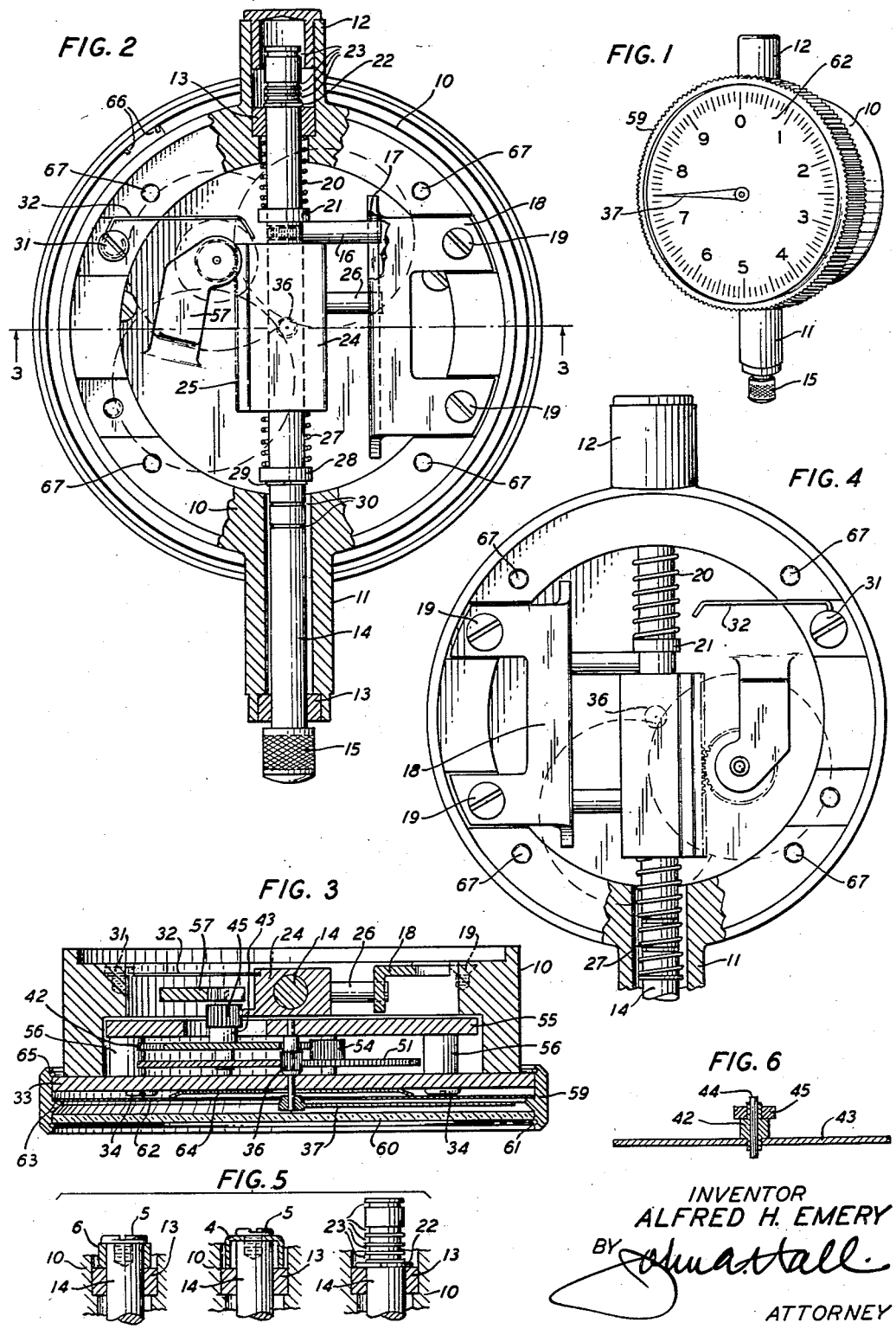
INVENTOR
ALFRED H. EMERY
BY
ATTORNEY

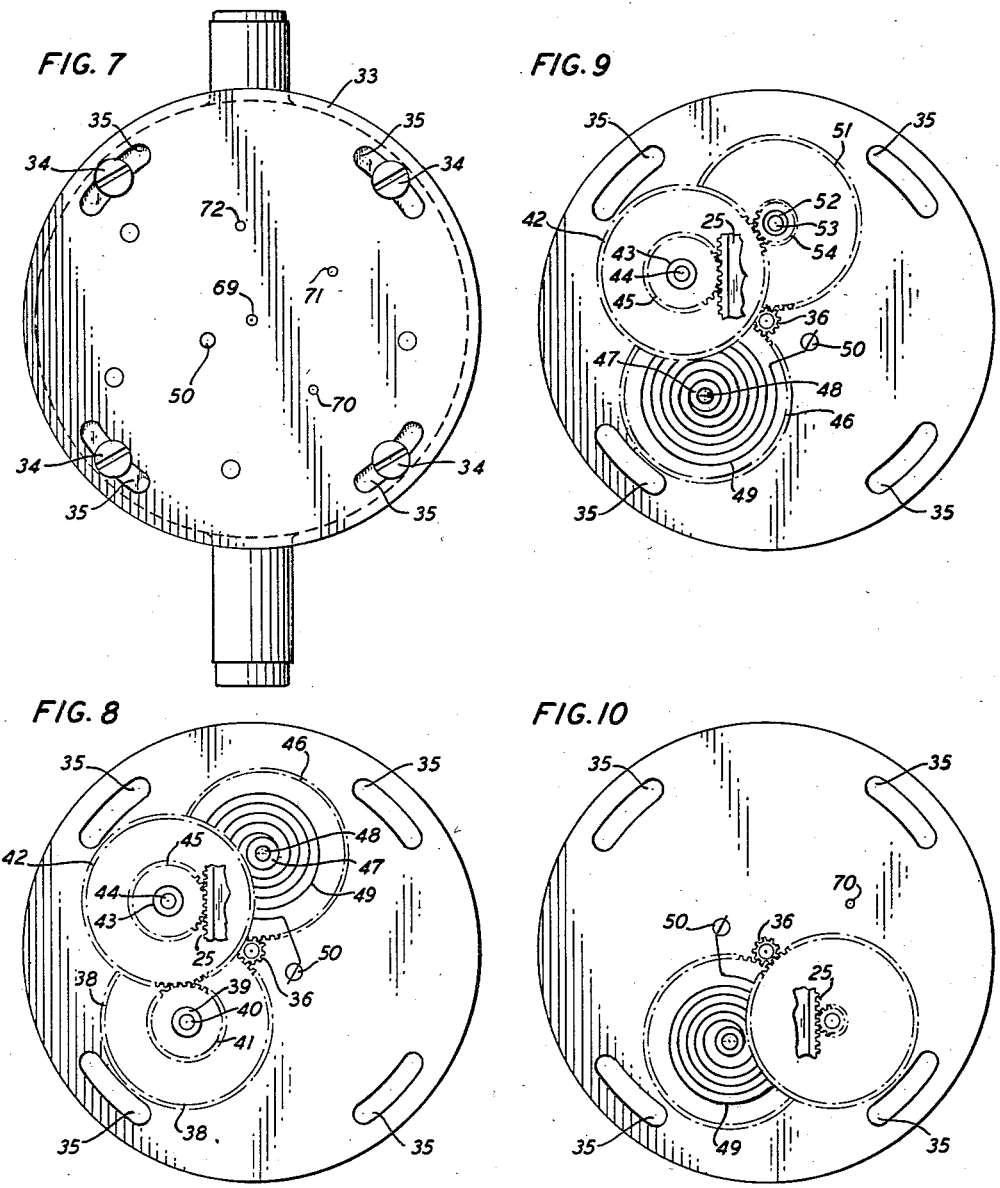

United States Patent Office 2,799,941
Patented July 23, 1957

2,799,941

MULTI-RANGE ADJUSTABLE DIAL INDICATOR GAUGE

Alfred Hamilton Emery, Poughkeepsie, N. Y.

Application March 15, 1954, Serial No. 416,238

13 Claims. (Cl. 33—172)

This invention relates to dial indicators of the rack and pinion type.

The object of the invention is to provide means including a stock or a kit of a minimum number of parts for adjusting the device over variable limits to the different ranges of the device and the corresponding indicator means within each such range. In each case where the limits of a given range are fixed the reading dial pointer is correspondingly adjusted for a full scale indication.

Whereas prior art devices have always required a separate spindle for each individual range, the present invention requires but a single spindle which may be universally employed through the use of simple means for limiting the movement thereof to correspond to the particular range to which the device may be adjusted. Such means takes the form of a simple stop whereby the amount by which the feeler end of the spindle may protrude from the casing corresponds substantially to the range to which the device may be adapted.

The simple stop may take a variety of forms, such as washers, shims, inverted caps or collars, or a simple snap washer inserted in a recess machined in the spindle itself. From the standpoint of economy and simplicity the simple washers, each of which effectively shortens the spindle by a given amount, are effective and practical. The preferred embodiment of the invention, however, and that more in keeping with the nature and the object of the invention, consists of a plurality of recesses machined in the spindle into any one of which a spring steel snap washer may be fixed. By this means no provision need be made for safe and convenient storage of the small parts of a kit during the times the dial indicator is being used with a particular adjustment.

Again, prior art devices required a large number and variety of gears and gear supporting members to adjust and vary the degree of magnification between the feeler or probe and the indicating pointer. A feature of the present invention is the use of a minimum number of pinion and gear combinations adapted to be mounted in a standard arrangement of bearing holes not exceeding the largest number of gears used in any one combination. In other words, in accordance with the present invention, a single pair of gear supporting members have been provided with the bearing holes spaced and located in such a manner that gear and pinion combinations may be interchanged to provide different ratios while supported in said bearing holes without any additional supports.

Another feature of the invention is the use of different numbers of gears in a train, still using the same minimum number of bearing holes but with provision for effectively mounting the bearing plates at a straight angle to accommodate the change in direction of the pointer when a change in the number of gears is made. By way of example it will be noted that when but a single pinion and gear unit is interposed between the rack and the hand pinion, the rack will be on the right hand side of the spindle, whereas when two pinion and gear units are introduced into this train the rack will be on the left hand side of the spindle. By the same token the gear supporting member will be mounted at a straight angle in the two cases. A feature of the invention is a symmetrical design and construction of the casing whereby the means within may be mounted in what may be termed either a right or left hand arrangement. By this means for right or left hand mounting, the gear supporting members having a minimum number of bearing holes formed therein in a standard arrangement and a minimum number of standard pinion and gear combinations, a large number of different range dial indicators may be produced. Through such an arrangement supplemented by a kit of a very few parts, a user of the device will be enabled to readjust the device to different ranges and thus avoid the purchase of a plurality of such indicators to fulfill his needs for different range instruments.

Another feature of the invention is the use of a centrally located bearing hole for a hand pinion and a plurality of gear bearing holes all located equidistantly from said pinion bearing hole but at varying distances one from another. The gears mounted in these bearing holes are all of uniform diameter and number of teeth but each has mounted securely a different sized pinion so that varying multiplying combinations may be selected and mounted. One gear, not provided with a pinion but instead provided with a hairspring constitutes a backlash arrangement and since this gear is also of the same diameter it may be mounted at random in any one of the bearing holes left after the selected combination of multiplying gears has been mounted.

A feature of the invention is a novel fabricated pinion and gear combination in which both a pinion and a gear are placed on a common cylindrical hub carefully aligned on the axis of these members and into which a hardened rod is forced whereby both the pinion, the gear and the axial rod are firmly gripped and will thereafter function as a unit. By this arrangement the said rod which may be of hardened steel, bronze, tungsten carbide, or any other desirable material, may be employed as the bearing pivots by which the assembly is located for rotation. Also, by this arrangement the pinion and gears may be made of lightweight or otherwise suitable durable material such as brass or steel and the hub may be of such light material as magnesium, aluminum and so forth. Again, by this construction, repairs may be easily made by replacing the pivot shaft or center rod when this becomes worn rather than replacing the far more expensive pinion and gear assembly. Thus, each part of the assembly may be fabricated of the material most suitable for its particular function so that compromises necessitated by integral construction of gear wheels and pivots therefor are avoided.

Another feature of this construction is that the center rod or pivot shaft may be made of different lengths, as when the pivot shaft of a given unit must extend through the face of the device to carry a tell-tale hand which acts as a revolution counter for the large hand.

Another feature of the invention is a shockproof construction for protecting the delicate mechanism of the gear train from damage at the far end of its travel. Means for avoiding the ill effects of sudden starting of the movement of such gear train are conventional, and such conventional means also protect the device against a sudden and violent return to normal position. In accordance with the present invention, additional means of a novel nature is provided to protect the mechanism against a sudden and violent stop when the spindle is moved forwardly beyond the range of the instrument and the movement of the spindle is stopped by encounter with the frame of the device. Here the block slidably mounted on the spindle is spring mounted so that it will not respond to a sudden and violent forward movement of the spindle, but will follow at such a rate that no injury to the gears will be caused.

In addition, just before the spindle comes to a sudden and violent stop the rack block will tend to continue its movement and will come to a stop slowly through encounter with a cushioning spring. In a preferred form of the invention this cushion spring takes the form of a leaf spring secured to the frame with its free end placed so that the rack block will encounter it just as the hand pointer comes to the end of the scale.

Another feature of the invention is a means for adjusting the force exerted by the spring used to hold the sliding rack block upward. This is the conventional spring which gives way when the feeler or probe is pushed in too suddenly or violently and which protects the gearing against shock. Since the load on this spring varies with the amount of the magnification of the movement provided by the gears, a nice adjustment between quick response of the device and protection of the gears may be had by making this spring adjustable. It is, of course, obvious that a differently loaded spring may be used with each different train of gears, but in keeping with the object of the present invention, the same effect may be attained by using means to vary the dimension of the compressed spring, thus leading to economy in manufacture or, alternatively, to adjustability of the device in service.

Like the means employed for adjusting the effective length of the stroke of the device, the present means may take a variety of forms, but here again the preferred form is similar to that used before, that is, the spindle has machined in it at convenient distances below the lowermost surface of the rack bar a series of recesses into one of which, selectively, a snap washer may be placed as a stop for the said spring.

Other features will appear hereinafter.

The drawings consist of two sheets, having ten figures, as follows:

Fig. 1 is a perspective view of a dial indicator gauge;

Fig. 2 is a view partly in section looking into the gauge from the rear;

Fig. 3 is a sectional view taken on the line 3—3 of Fig. 2;

Fig. 4 is a view similar to Fig. 2 showing how the slide guide and other elements may be mounted in the case at a straight angle so that a different alignment of gears may be used;

Fig. 5 is a group of fragmentary sketches partly in section showing alternative methods of adjusting the range of the instrument;

Fig. 6 is a sectional view of a single pinion gear combination showing how these elements are fabricated;

Fig. 7 is a view of the indicator gauge looking at the device from the front after the gear unit has been attached thereto but before the dial and the bezel have been placed thereon; and Figs. 8, 9 and 10 are three different views of the base plate on which the gears are mounted showing three different arrangements of the assembly of the gear train to illustrate the manner in which different range devices may be assembled on a universal base plate.

In the drawings there is shown a dial indicator comprising a case 10 having a protruding lower stem 11 and an upper stem 12. These stems are provided with bushings 13 which support a work actuated spindle 14, having a work engaging contact 15 at its lower end. A guide pin 16, fixed to the spindle 14, prevents its rotation by being restricted to move in a direction parallel to the axis of the spindle 14, in a slide guide or elongated slot 17 in a bracket 18. The bracket 18 is secured to the case 10 by two screws 19.

It will be clear from Figs. 2 and 4 that the bracket 18 may be mounted either on the right or on the left hand side of the case. It will later appear that this arrangement is made so that different gear combinations may be established since a change in the number of gears involves a change in the direction of rotation of the hand pinion 36.

The spindle 14 is urged in a projected direction with respect to the case 10 by means of a compression spring 20 slipped over the spindle 14 with its outer end in contact with the bushing 13 and its inner end in contact with the collar 21 fixed to the spindle 14 and resting against the guide pin 16. The projected movement of the spindle 14 is limited by a snap ring 22 which is inserted in any one of the grooves 23, selected in accordance with the range to which the device is adjusted.

This feature of the invention is shown in some detail in Fig. 5 wherein the means for adjusting the apparent length of the spindle to provide for different ranges is shown in three alternative forms. In one form, that shown in the fragmentary sketch to the left, the spindle is effectively shortened by the placing of a washer 6 under the head of a retaining screw 5, whereby the space between the upper end of the probe or feeler 15 and the lower surface of the bushing 13, as indicated in Fig. 2, is shortenend to correspond with the range for which the device is adjusted. In the second form, shown in the middle fragmentary sketch of Fig. 5, an inverted cup-like piece 4 is used instead of the washer 6. This cup-like piece has the merit that it may be tightened to the spindle 14 by the retaining screw 5. The third and preferred means is shown in the right hand fragmentary sketch of Fig. 5 and this consists of a series of grooves machined into the spindle 14 and in which a snap ring 22 may be selectively placed.

It may be noted that if these dial indicator gauges are supplied to customers along with a kit of parts whereby the customer may adjust the device to different ranges, that the preferred form of this range adjusting means does not involve extra parts which must be carefully stored but relies only on the single snap ring 22 which will always be placed in one of the various grooves 23.

Slidably mounted on the spindle 14 is a block 24 provided with a rack 25 along one of its edges, the teeth of which will mesh with the teeth of a pinion 45. A guide pin 26 rigidly fixed to the edge of the block 24 opposite the teeth 25 prevents rotation of the block 24, since this pin is also guided in the slot 17 of the bracket 18.

Sliding block 24 is urged in the direction toward and into contact with guide pin 16 by compression spring 27 slipped over the spindle 14. One end of the spring 27 abuts the lower end of the sliding block 24 and the other end pushes against a collar 28 which rests against a snap ring 29 inserted in any one of a number of grooves 30 formed in the spindle 14. Changing the snap ring 29 to one groove from another varies the spring pressure applied to the sliding block 24 by the spring 27 to furnish different amounts of pressure for driving different combinations of gears. It will be obvious that a greater spring pressure will be needed to drive the indicator hand when the range of the instrument is small.

Fastened to the case 10 by means of a screw 31 is a resilient limiting stop 32 to arrest the inward movement of the block 24 slightly before the inward movement of the spindle 14 is stopped by the contact between the work engaging probe 15 and the lower end of stem 11. This spring, which may be in the form of a leaf spring, constitutes a cushioning means normally out of engagement with the rack bar 24, but constructed and arranged to perform its function as the dial indicator hand reaches the limit of its travel.

A gear train unit is made up essentially of a base plate 33 and a cooperating plate 55 held together by stand off collars 56. Such a unit may be fully assembled and, with its various gears, placed into the case with the teeth of the pinion 45 out of mesh with the rack 25 and then rotated gently until a proper mesh between this pinion and the rack is established. Thereafter the plate 33 may be fixed in place and secured to the front face of the case by the screws 34 inserted through the elongated slots 35.

Substantially in the center of the plate 33 is a hand pinion 36, to which a hand 37 may be attached after the dial has been placed in the bezel and before the glass face has been finally fixed in the device. As shown in Fig. 8, a gear 38, located so as to mesh with the pinion 36, fixed to a hub 39 having a shaft 40 forced longitudinally through its center, is placed in one of the pivot holes 72. The pinion 41 is also fixed to the hub 39 and the shaft 40. This pinion 41 then meshes with a gear 42 fixed to a hub 43 and a shaft 44. Also fixed to the hub 43 is a pinion 45 arranged to mesh with the teeth of the rack bar 25.

Looking at Fig. 9 and at Fig. 3, it may be noted that a gear 51 mounted on a hub 52 and a shaft 53 also carries a pinion 54. This pinion is arranged to mesh with the gear 42 fixed to the hub 43 and in turn fixed to the pivot shaft 44. This pivot shaft 44 and hub 43 also carry the pinion 45 which meshes with the rack teeth 25.

It will later be shown that the supporting plate 33 is drilled with three pivot holes 70, 71 and 72 which are equidistant from the center 69 thereof. However, the distance between the holes 70 and 71 is different from the distance between the holes 71 and 72. This will be particularly noted in Fig. 8 and Fig. 9, where the gear 42 meshes with a pinion 41 which is larger than the pinion 54 with which it meshes in Fig. 9. Again it may be noted in Figs. 2 and 4, where the supporting plate has been mounted at a straight angle, that a slight rotary adjustment may be made to accommodate various size pinions which mesh with the rack bar.

In each combination of gearing there will be employed a gear 46 which meshes with the pinion 36. By means of a spiral spring 49 affixed to a pin 50 this will act as an anti-back-lash device to hold the teeth of the gears and pinions always together.

It may be noted that a part of the plate 55 may be formed as a bridge 57 whereby the pinion 45 is located beyond the outer surface of the plate 55 in order to mesh with the teeth of the rack bar 24.

After the gear unit has been placed within the case 10 and gently rotated until a proper mesh is established between the pinion 45 and the rack 24, the bezel 59 is placed on the device with a dial 62 and a spring 64 supported therein by a projection 63 of the bezel. The bezel is then secured in place by a spring ring 65 terminating in the bent ends 66 for easy placement and adjustment. Thereafter the hand 37 is placed on the shaft of the hand pinion 36 and the crystal 60 placed within the bezel and secured by another spring ring 61.

A feature of the invention is the use of a standard gear mounting plate which may be used for many different combinations of gearing. Thus the mounting plate 33, whose back surface is shown in Fig. 7, is provided with a bearing hole 69 for the shaft of the hand pinion 36 and three bearing holes 70, 71 and 72, into which the various pinion and gear combination shafts may be placed. Invariably, as shown in the three front surface views in Figs. 8, 9 and 10, the shaft of the pinion gear combination whose pinion meshes with the rack 25 is placed in the bearing hole 71. If but a single pinion gear combination is to be used, as indicated in Figs. 4 and 10, then the plate 33 is rotated until the proper mesh between the pinion and the rack 25 is established at the right hand side of the spindle 14. If another pinion gear combination is to be used in the train, then this pinion gear combination is placed in either the pivot hole 70 or 72, as indicated in Figs. 8 and 9, and the whole unit rotated by a straight angle so that the mesh between the teeth of the pinion and the rack 25 is at the left hand side of the spindle.

In accordance with this feature the bearing holes 70, 71 and 72 are all equidistant from the center point 69 but the distance between the holes 70 and 71 is different from the distance between the holes 71 and 72 whereby different gear combinations may be accommodated and whereby the backlash gear may be fitted in at different positions after the more important measuring gears have been placed in accordance with the varying number of teeth of their pinions.

A feature of the invention is the fabrication of the pinion gear units shown in one example in Fig. 6. Here the pinion 45 and the gear 43, made of material suitable for such units, are placed on a hub 42 which is then expanded by having the shaft 44 forced therethrough. By such expansion of the shaft, the pinion 45 and the gear 43 are firmly affixed to the hub and the two will operate as an integral unit. By this means materials suitable for the functioning of each part may be employed. The shaft 44 may be of any suitable length so that its ends may be used as pivot points. Where such pivot points are exposed to wear a new pivot may be placed in such a unit without abandoning the more expensive gear and pinion elements.

The screw holes 67 in the case 10 are provided for attaching a back, not shown, having a conventional lug thereon for mounting the device in relation to a work piece which it will be employed to measure.

What is claimed is:

1. In a dial indicator, a case, a spindle mounted in said case and having a movement of translation along the longitudinal axis thereof, a toothed rack bar slidably mounted on said spindle, a spring for urging said spindle in a projected position relative to said case, a spring for urging said rack bar along said spindle in the opposite direction, another spring for urging said rack bar in said first direction, said last spring being engaged by said rack bar in a position beyond the normal active measuring range thereof, a dial, a dial hand mounted to rotate over the face of said dial, a pinion for rotating said hand, and a train of gears intermeshing with said toothed rack and with said hand pinion.

2. In a dial indicator, a case, a spindle mounted in said case and having a movement of translation along the longitudinal axis thereof, a toothed rack bar slidably mounted on said spindle, a spring for urging said spindle in a projected position relative to said case, a spring for urging said rack bar along said spindle in the opposite direction, a spring to oppose said second spring normally out of engagement with said rack bar arranged to be engaged thereby near the limit of the stroke of said rack bar, a dial, a dial hand mounted to rotate over the face of said dial, a pinion for rotating said hand, a train of gears intermeshing with said toothed rack and with said hand pinion anid means for limiting the extent of the projection of said spindle to a preselected value.

3. In a dial indicator, a case, a spindle mounted in said case and having a movement of translation along the longitudinal axis thereof, a toothed rack bar slidably mounted on said spindle, a spring for urging said spindle in a projected position relative to said case, a spring for urging said rack bar along said spindle in the opposite direction, a dial, a dial hand mounted to rotate over the face of said dial, a pinion for rotating said hand, and a train of gears intermeshing with said toothed rack and with said hand pinion, characterized in this, that said train of gears consists of a hub having a longitudinal bore therethrough, a pinion and a gear both having axial apertures in which said hub is tightly fixed, and a pivot shaft extending through said bore and compressing said hub radially against said pinion and said gear, thereby fixing them firmly on said hub.

4. In a dial indicator, a case, a toothed rack mounted in said case and having a movement of translation along the longitudinal axis thereof, an indicator unit comprising a base plate, a dial, a dial hand mounted to rotate over the face of said dial, a pinion for rotating said hand mounted in said base plate and a train of gears mounted on said base plate for intermeshing with said toothed rack and with said hand pinion, said unit being constructed and arranged for attachment to said case said base plate containing a number of pivot holes for said gears equal to the maximum number of gears used in any given combination thereof equidistantly placed from said hand pinion and at varying distances from each other for mounting said train of gears in different combinations of number of gears and of multiplying values, said gears consisting of a plurality of pinion gear combinations of various sized pinions each coupled with and secured to an identical gear, one gear in each said combination consisting of a lone gear urged in one direction by a hair spring for constantly exerting pressure on said train of gears for anti-backlash purposes.

5. In a dial indicator, a case, a spindle mounted in said case and having a movement of translation along the longitudinal axis thereof, a toothed rack on said spindle, a stop on said spindle to limit the movement of said rack along said spindle, a spring to urge said spindle in a projected position relative to said case, means to selectively change the extent of movement of said spindle and to adjust the tension of said spring consisting of a plurality of grooves cut in said spindle at predetermined positions and a snap ring selectively placed in one of said grooves, a second spring for urging said toothed rack along said spindle to normally hold said toothed rack against said stop and means for adjusting the tension of said second spring consisting of a plurality of grooves cut in said spindle at predetermined positions, a loose collar on said spindle and a snap ring selectively placed in one of said grooves, said collar and said snap ring constituting a lower abutment for said second spring and said toothed rack constituting an upper abutment for said second spring.

6. In a dial indicator, a case, a spindle in said case having a movement of translation along the longitudinal axis thereof, a toothed rack bar slidably mounted on said spindle, a spring for urging said spindle in a projected position relative to said case, a spring for urging said rack bar along said spindle in the opposite direction, a limiting spring mounted to engage said rack bar and to oppose the further movement thereof beyond the normal active measuring range thereof, a slide guide mounted on said case in parallel relationship to said spindle, a pin on said spindle and a pin on said rack bar in cooperative relationship with said slide guide to prevent a movement of rotation of said spindle and said rack bar, an indicator unit comprising a base plate, a dial, a dial hand mounted to rotate over the face of said dial, a pinion for rotating said hand mounted in said base plate and a train of gears including measuring gears and a backlash gear mounted on said base plate for intermeshing with said toothed rack and with said hand pinion, said unit being constructed and arranged for attachment to said case with one of said gears in mesh with said toothed rack, said base plate containing a number of pivot holes for said gears equal to the maximum number of gears used in any given combination thereof equidistantly placed from said hand pinion and at varying distances from each other for mounting said train of gears in different combinations of number of gears and of multiplying values whereby said backlash gear may be mounted at random in any of said pivot holes left unoccupied after a said combination of measuring gears has been mounted.

7. In a dial indicator, a case, a spindle carrying rack teeth mounted in said case for longitudinal movement along the axis thereof, an indicating unit secured to said case having a plurality of gears of uniform diameter, each said gear having secured thereto a pinion, said pinions being of different diameter and number of teeth, a hand pinion mounted on said indicating unit, said gears and pinions constituting a train intermeshed between said rack teeth and said hand pinion, said indicating unit including a base plate for mounting said gears and hand pinion and having a plurality of bearing holes, including a centrally located bearing hole for said hand pinion, said bearing holes being spaced equidistantly from said pinion bearing hole and at varying distances one from another, whereby different combinations of said gears to provide different amplifying trains may be mounted upon said base plate.

8. In a dial indicator, a case, a spindle carrying rack teeth mounted in said case for longitudinal movement along the axis thereof, an indicating unit secured to said case having a plurality of gears of uniform diameter and number of teeth, one of said gears having a hairspring for backlash operation and the remainder of said gears each having secured thereto a pinion of differing diameter and number of teeth, a hand pinion mounted on said indicating unit, said gears and pinions constituting a train intermeshed between said rack teeth and said hand pinion, said backlash gear meshing only with said hand pinion, said indicating unit including a base plate for mounting said gears and said hand pinion and having a plurality of bearing holes, including a centrally located bearing hole for said hand pinion, said bearing holes being spaced equidistantly from said pinion bearing hole and at varying distances one from another whereby different combinations of said gears to provide different amplifying trains may be mounted on said base plate and whereby said backlash gear may be mounted at random in any spare one of said bearing holes.

9. In a train of gears intermeshing with a toothed rack and a hand pinion in a dial indicator, a plurality of pinion gear combinations each consisting of a gear and a pinion fixed to a pivot shaft, each said gear and each said pinion having an axial bore, a hub for closely fitted insertion into said bores in said gear and pinion combination, said hub having an axial bore, a pivot shaft having a diameter sensibly greater than said axial bore in said hub whereby said pivot shaft forced into said axial bore of said hub produces expansion thereof to firmly fix said pivot shaft, said hub, said gear and said pinion together.

10. In a train of gears intermeshing with a toothed rack and a hand pinion in a dial indicator, a plurality of pinion-gear combinations each consisting of a standard metal gear and a different sized metal pinion tightly fitted over a metal hub, an axial bore extending through said hub, a pivot shaft having a diameter sensibly greater than said axial bore in said hub whereby said pivot shaft forced into said axial bore of said hub produces expansion thereof to firmly fix said pivot shaft, said hub, said gear and said pinion together, said pivot shaft extending from each end of said hub to form trunnion bearings for rotation of said pinion-gear, said pivot shafts being constructed of substantially hard material to provide trunnion bearings having the necessary hardness without affecting the physical characteristics of the remainder of the said components.

11. In a dial indicator, a case, a spindle mounted in said case and having a movement of translation along the longitudinal axis thereof, a toothed rack bar slidably mounted on said spindle, a spring for urging said spindle in a projected position relative to said case, a spring for urging said rack bar along said spindle in the opposite direction, means for adjusting the pressure of said second spring, another spring engaged by said rack bar beyond the end of its stroke in said opposite direction to provide a cushioned stop therefor, a dial, a dial hand mounted to rotate over the face of said dial, a pinion for rotating said hand, a train of gears intermeshing with said toothed rack and with said hand pinion and means for limiting the projection of said spindle to a preselected value.

12. In a dial indicator, a case, a spindle mounted in said case and having a movement of translation along the longitudinal axis thereof, a toothed rack bar slidably mounted on said spindle, a spring for urging said spindle in a projected position relative to said case, a spring for urging said rack bar along said spindle in the opposite direction, means for adjusting the pressure of said second spring, said means consisting of a collar on said spindle and means for fixing said collar in different positions thereon, another spring engaged by said rack bar beyond the end of its stroke in said opposite direction to provide a cushioned stop therefor, a dial, a dial hand mounted to rotate over the face of said dial, a pinion for rotating said hand, a train of gears intermeshing with said toothed rack and wth said hand pinion and means for limiting the extent of the projection of said spindle to a preselected value.

13. In a dial indicator, a case, a spindle mounted in said case and having a movement of translation along the longitudinal axis thereof, a toothed rack bar slidably mounted on said spindle, a spring for urging said spindle in a projected position relative to said case, a spring for urging said rack bar along said spindle in the opposite direction, means for adjusting the pressure of said second spring, said means consisting of a collar on said spindle, a plurality of grooves formed in said spindle at different positions therein and a snap ring selectively placed in one of said grooves to fix said collar in different positions on said spindle, another spring engaged by said rack bar beyond the end of its stroke in said opposite direction to provide a cushioned stop therefor, a dial, a dial hand mounted to rotate over the face of said dial, a pinion for rotating said hand, a train of gears intermeshing with said toothed rack and with said hand pinion and means for limiting the extent of the projection of said spindle to a preselected value.

References Cited in the file of this patent

UNITED STATES PATENTS

| | | |
|---|---|---|
| 793,027 | Burton et al. | June 20, 1905 |
| 928,492 | Brink | July 20, 1909 |
| 1,317,227 | Scusa | Sept. 30, 1919 |
| 1,617,485 | Hughes | Feb. 15, 1927 |
| 1,966,424 | Ames | July 17, 1934 |
| 2,010,057 | Buckwalter | Aug. 6, 1935 |
| 2,178,745 | Emery | Nov. 7, 1939 |
| 2,210,435 | Ruf | Aug. 6, 1940 |
| 2,484,771 | Worthen | Oct. 11, 1949 |
| 2,527,173 | Boat | Oct. 24, 1950 |
| 2,645,857 | Andersson | July 21, 1953 |

OTHER REFERENCES

"Starrett Dial Indicators" 2nd. ed.; published by The L. S. Starrett Co., Athol, Mass.